United States Patent
Sung et al.

(10) Patent No.: US 8,315,512 B2
(45) Date of Patent: Nov. 20, 2012

(54) METHOD AND APPARATUS FOR AUTO-FOCUS CONTROL OF DIGITAL CAMERA

(75) Inventors: Woon-Tahk Sung, Seoul (KR); Byung-Kwon Kang, Gyeonggi-do (KR); Jae-Sik Sohn, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/004,472

(22) Filed: Jan. 11, 2011

(65) Prior Publication Data

US 2011/0170846 A1  Jul. 14, 2011

(30) Foreign Application Priority Data

Jan. 12, 2010  (KR) .................. 10-2010-0002854

(51) Int. Cl.
*G03B 13/32* (2006.01)
(52) U.S. Cl. .......................... 396/90; 348/353
(58) Field of Classification Search ............ 396/90, 396/89; 348/345, 353
See application file for complete search history.

(56) References Cited

U.S. PATENT DOCUMENTS

| | | | | |
|---|---|---|---|---|
| 4,465,352 A | * | 8/1984 | Hirobe et al. | 396/90 |
| 4,580,043 A | * | 4/1986 | Imai | 396/111 |
| 5,040,228 A | | 8/1991 | Bose et al. | |
| 2004/0212721 A1 | | 10/2004 | Watanabe | |
| 2008/0069553 A1 | | 3/2008 | Li et al. | |
| 2008/0219655 A1 | | 9/2008 | Yoon et al. | |
| 2008/0317452 A1 | | 12/2008 | Kim et al. | |
| 2009/0186655 A1 | * | 7/2009 | Wernersson | 348/348 |
| 2010/0194971 A1 | * | 8/2010 | Li et al. | 348/349 |

FOREIGN PATENT DOCUMENTS

| | | |
|---|---|---|
| EP | 1 691 541 | 8/2006 |
| JP | 2005-331690 | 12/2005 |
| KR | 1020060038166 | 5/2006 |
| KR | 1020080081693 | 9/2008 |
| KR | 1020080112065 | 12/2008 |
| KR | 1020090047309 | 5/2009 |
| KR | 1020090065891 | 6/2009 |
| WO | WO 2005/073895 | 8/2005 |

* cited by examiner

*Primary Examiner* — Christopher Mahoney
(74) *Attorney, Agent, or Firm* — The Farrell Law Firm, P.C.

(57) ABSTRACT

Disclosed is a method for auto-focus control of a digital camera, the method including moving a focus lens of the digital camera to a position for a longest-distance photographing, and then extracting an edge value according to a corresponding position while moving the focus lens by a preset interval in a direction toward an image sensor; estimating a form of a preset function based on the extracted edge values, and calculating a maximum value of the estimated function; calculating a difference between a maximum value of the preset function calculated at a first current position of the focus lens and a maximum value of the preset function calculated at a previous position of the focus lens; and moving the focus lens to a position corresponding to a currently-calculated maximum value of the preset function when the difference between the maximum value of the preset function calculated at the first current position of the focus lens and the maximum value of the preset function calculated at the previous position of the focus lens is less than or equal to a preset threshold value.

11 Claims, 6 Drawing Sheets

METHOD AND APPARATUS FOR AUTO-FOCUS CONTROL OF DIGITAL CAMERA

PRIORITY

This application claims priority to an application entitled "Method and Apparatus for Auto-Focus Control of Digital Camera" filed in the Korean Industrial Property Office on Jan. 12, 2010, and assigned Serial No. 10-2010-0002854, the contents of which are hereby incorporated by reference.

BACKGROUND OF THE INVENTION

1. Field of the Invention

The present invention relates generally to a digital camera, and more particularly, to a method and apparatus for auto-focus control of a digital camera.

2. Description of the Related Art

Recently, digital cameras, in general, and in particular high-pixel digital cameras installed in mobile devices, such as cellular phones, have an auto-focus function for automatically focusing the lens when taking a photograph.

Generally, such an auto-focus control method is one of a phase-difference detection scheme typically employed in Digital Single Lens Reflex (DSLR) cameras, and a contrast detection scheme typically employed in compact digital cameras and cellular phone cameras. The phase-difference detection scheme distributes light, which has passed through a lens, between a viewfinder and an auto-focus (AF) sensor through a mirror, to separate light which is incident on the AF sensor in two directions on a focus surface, to detect both beams of light by means of a line sensor, and to determine if the camera is focusing on a foreground or a background. Such a phase-difference detection scheme requires a lens system and a separate sensor for auto-focusing.

Figure 1A:
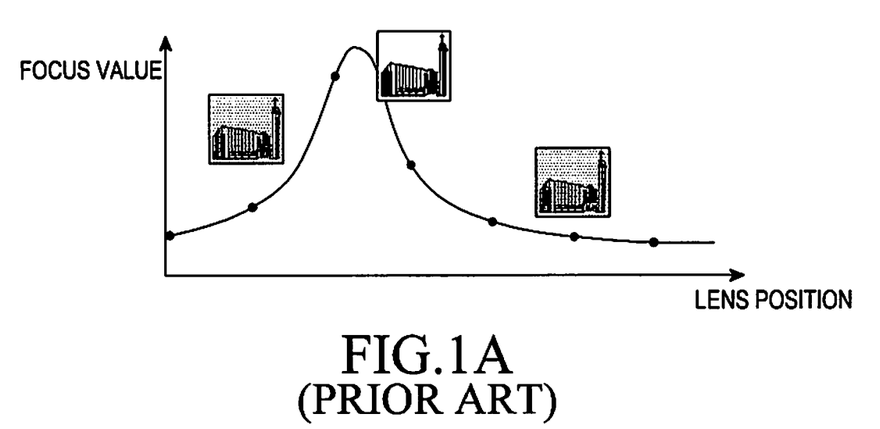
FIGS. 1A and 1B schematically illustrate the operation of an auto-focus control method using a normal contrast detection scheme.
Figure 1B:
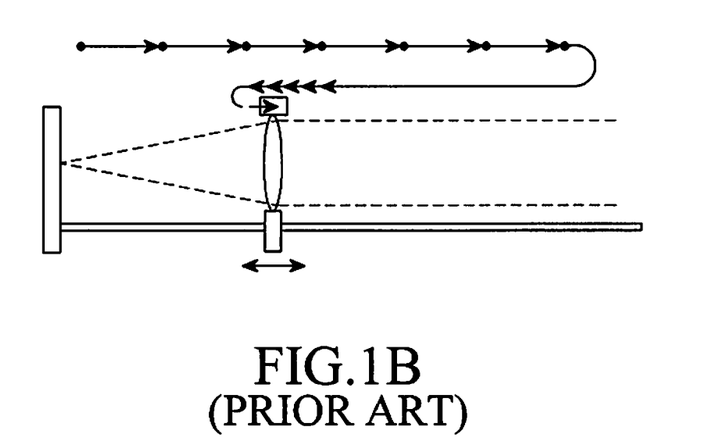

The contrast detection scheme is based on a hill climbing method for finding a position at which an edge value is a maximum while moving a focus lens in given steps within an entire movable range of the focus lens or a part of the movable range. FIG. 1 schematically illustrates the operation of an auto-focus control method using a normal contrast detection scheme. As shown in FIG. 1A, the contrast detection scheme is implemented in such a manner as to trace a change in an edge value, which is obtained by filtering an electrical signal given from an image sensor, according to each position while moving a focus lens at the same intervals, and to move the focus lens to a focus position where the highest focus value is obtained according to a result of the tracing, as shown in FIG. 1B.

In such conventional technologies, it is important to find a position having a maximum value without a large error while controlling an interval between positions between which a lens moves and a movement direction of the lens. However, as a higher accuracy and a high success rate are required, a processing time and the number of positions required for edge value sampling increase. In this case, an auto-focus control time increases, so that an interval between a photographing time point intended by the photographer and a time point at which a photograph is actually taken after auto-focus control may be longer. In particular, since an exposure time of an image sensor becomes longer under a low illumination, the operation time of the auto-focus control further increases.

SUMMARY OF THE INVENTION

Accordingly, the present invention has been made to solve the above-mentioned problems occurring in the prior art, and the present invention provides an auto-focus control method and apparatus for rapidly achieving an auto-focus control in a digital camera.

In accordance with an aspect of the present invention, there is provided a method for auto-focus control of a digital camera, the method including moving a focus lens of the digital camera to a position for a longest-distance photographing, and then extracting an edge value according to a corresponding position while moving the focus lens by a preset interval in a direction toward an image sensor; estimating a form of a preset function based on the extracted edge values, and calculating a maximum value of the estimated function; calculating a difference between a maximum value of the preset function calculated at a first current position of the focus lens and a maximum value of the preset function calculated at a previous position of the focus lens; and moving the focus lens to a position corresponding to a currently-calculated maximum value of the preset function when the difference between the maximum value of the preset function calculated at the first current position of the focus lens and the maximum value of the preset function calculated at the previous position of the focus lens is less than or equal to a preset threshold value.

In accordance with another aspect of the present invention, there is provided an apparatus for auto-focus control of a digital camera, the apparatus including a lens unit configured with a zoom lens and a focus lens which is movable along an optical axis in order to focus an optical image formed on an image sensor, the lens unit allowing an optical image of a subject to be formed on the image sensor; an image sensor unit for converting image information of the subject into an electrical signal; an image signal processor (ISP) for extracting an edge value from the electrical signal, into which image information has been converted; a driving unit for physically moving the lens unit according to a control signal received from a controller; and the controller for controlling the driving unit to move the focus lens of the digital camera to a position for a longest-distance photographing, extracting an edge value according to a corresponding position while moving the focus lens by a preset interval in a direction toward the image sensor, estimating a form of a preset function based on the extracted edge values, calculating a maximum value of the estimated function, calculating a difference between a maximum value of the preset function calculated at a first current position of the focus lens and a maximum value of the preset function calculated at a previous position of the focus lens, and controlling the focus lens to move to a position corresponding to a currently-calculated maximum value of the preset function when the difference between the maximum value of the preset function calculated at the first current position of the focus lens and the maximum value of the preset function calculated at the previous position of the focus lens is less than or equal to a preset threshold value.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, an apparatus and method according to embodiments of the present invention will be described with reference to the accompanying drawings. In the below description, many particular items such as a detailed component device are shown, but these are given only for providing a general understanding of the present invention. It will be understood by those skilled in the art that various changes in form and detail may be made within the scope of the present invention. Further, in the following description of the present invention, a detailed description of known functions and configurations incorporated herein will be omitted when it may make the subject matter of the present invention rather unclear.

The present invention provides a method and apparatus for achieving rapidly an auto-focus control in a digital camera, which will be described in detail with reference to the accompanying drawings.

Figure 2:
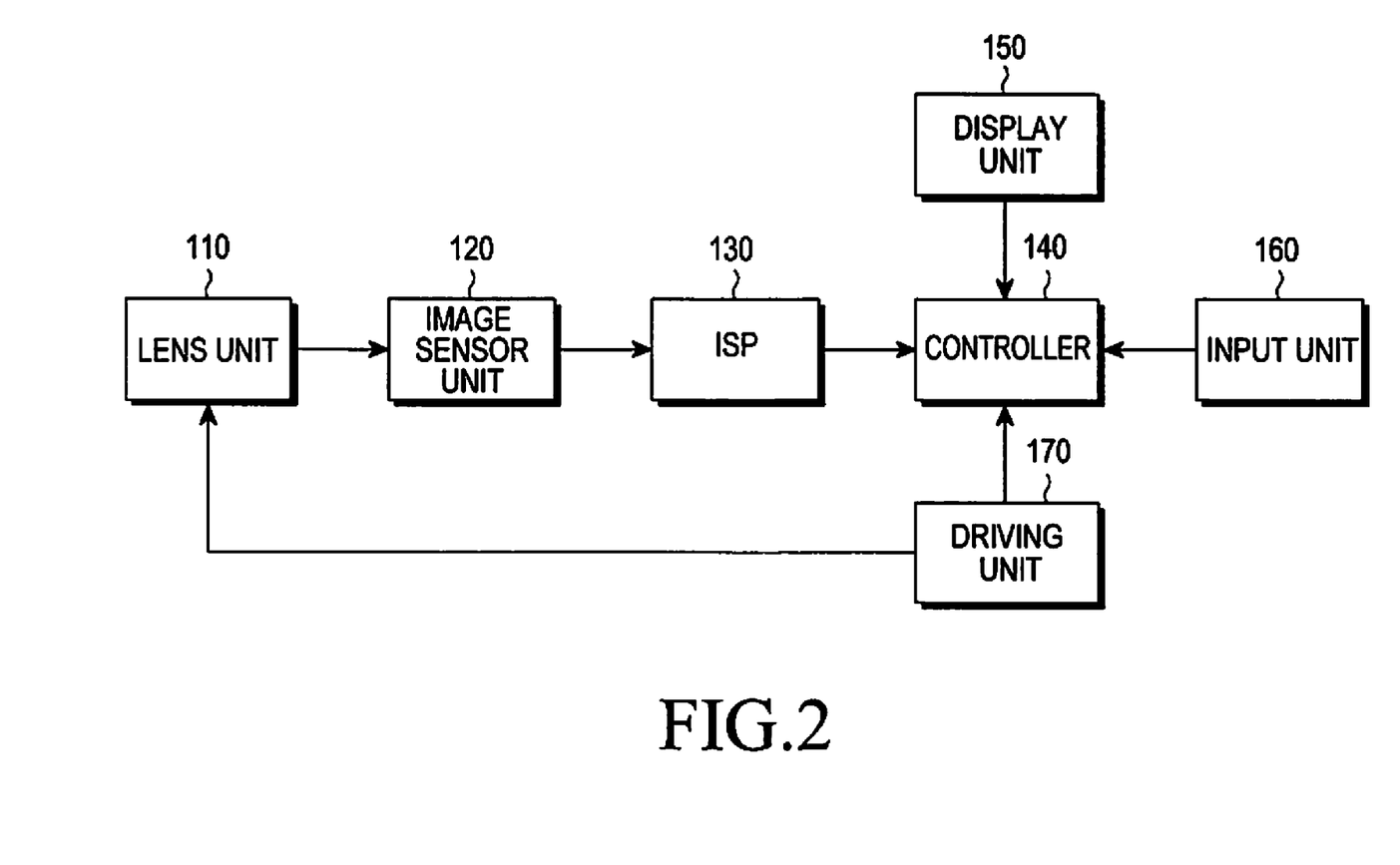
FIG. 2 is a block diagram illustrating the configuration of an auto-focus control apparatus according to an embodiment of the present invention.

FIG. 2 is a block diagram illustrating the configuration of an auto-focus control apparatus according to an embodiment of the present invention. Referring to FIG. 2, the auto-focus control apparatus according to an embodiment of the present invention includes a lens unit 110, an image sensor unit 120, an image signal processor (ISP) 130, a controller 140, a display unit 150, a driving unit 170, and an input unit 160.

The lens unit 110 forms an optical image of a subject on the image sensor unit 120. The lens unit 110 includes a zoom lens (not shown), and a focus lens (not shown) which is movable along an optical axis in order to focus the optical image formed on the image sensor unit. Through the lens unit 110, a digital image of a subject desired to be photographed by the user is obtained.

The image sensor unit 120 may include a complementary metal-oxide semiconductor (CMOS), a charge-coupled device (CCD), etc. The image sensor unit 120 is implemented in a form where a plurality of photo-detectors are integrated as the respective pixels, and converts image information of a subject into an electrical signal and then transfers the electrical data to the ISP 130.

The ISP 130 processes an image signal, which has been input from the image sensor unit 120, in units of frames. Also, according to an embodiment of the present invention, the ISP 130 extracts an edge value from the electrical signal, into which the image information has been converted.

The display unit 150 displays an image photographed according to the control of the controller 140.

The input unit 160 receives and transfers the user's input to the controller 140. When the display unit 150 is implemented with a touch screen, the display unit 150 can operate as an input unit.

The controller 140 controls the respective components of the digital camera. The controller 140 estimates a position having the maximum edge value from given edge value information, and outputs a control signal to the driving unit 170 to move the lens system to the estimated position.

Also, after controlling the driving unit 170 to move the focus lens of the digital camera to a position for the longest-distance photographing, the controller 140 extracts edge values through the ISP 130 according to each corresponding position while moving the focus lens by a preset interval, estimates a function having the form of an inverse function of a quadratic polynomial function based on the extracted edge values, and calculates the maximum value of the estimated function.

Then, the controller 140 moves the focus lens by the preset interval, extracts an edge value according to a corresponding position, again estimates a form of a function through the use of data, which contains the edge value extracted according to the current position of the focus lens, and the previously-extracted edge values, and calculates a difference between the maximum value of the quadratic polynomial function's inverse function calculated/estimated at the current position of the focus lens, and the maximum value of the quadratic polynomial function's inverse function calculated/estimated at a previous position of the focus lens.

Next, when the difference between the maximum value of the quadratic polynomial function's inverse function calculated/estimated at the current position of the focus lens, and the maximum value of the quadratic polynomial function's inverse function calculated/estimated at the previous position of the focus lens is less than or equal to a preset threshold value, the controller 140 controls the driving unit 170 to move the focus lens to the current position having the maximum value of the quadratic polynomial function's inverse function which is currently calculated/estimated.

The driving unit 170 physically moves the lens unit 110 according to a control signal received from the controller 140.

The digital camera may further include a buffer (not shown) for temporarily storing an image obtained through a photographing process.

Figure 3:
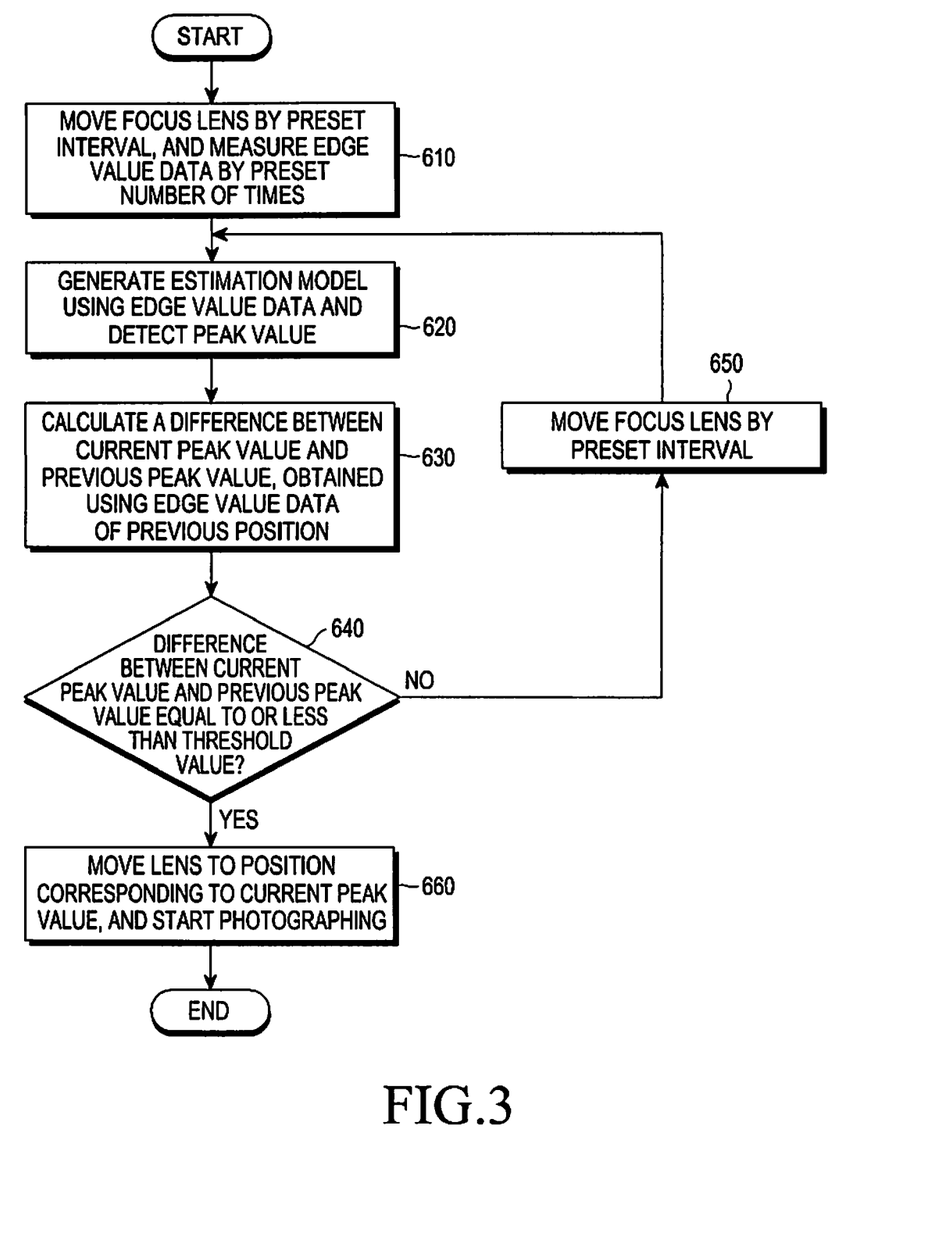
FIG. 3 is a flowchart illustrating the flow of the auto-focus control operation according to an embodiment of the present invention.

FIG. 3 is a flowchart illustrating the flow of the auto-focus control operation according to an embodiment of the present invention. Referring to FIG. 3, first, when an auto-focus control operation is executed, the controller 140 controls the driving unit 170 to move a focus lens to a position for the longest-distance photographing, and measures edge value data of corresponding positions while moving the focus lens by the preset interval from a corresponding position in a direction toward the image sensor 120 in step 610. In this case, while the focus lens moves at least three times, an edge value is extracted at each position.

Next, in step 620, an estimation model having the form of the quadratic polynomial function's inverse function is calculated through the use of the measured edge value data, and a peak value, that represents a position having the maximum value of the estimated function, is detected. According to an embodiment of the present invention, if the focus lens moves three times, three edge values are sampled, and an estimation mode is calculated through the use of the sampled edge value data. The calculation of the estimation model is performed in such a manner as to perform a fitting to a preset function through the use of an inverse matrix, and to calculate a position having the maximum value from a coefficient value of the fitted function. An estimation model having the form of the quadratic polynomial function's inverse function may be expressed as Equation (1) below.

$$y = \frac{1}{ax^2 + bx + c} \quad (1)$$

In Equation (1), "a, b, c" represent the coefficients of a quadratic polynomial function.

According to an embodiment of the present invention, in order to calculate an estimation model, an operation is performed in a least square method using a pseudo-inverse matrix. First, in order to obtain an estimation model as shown in Equation (1), a function for each edge value may be expressed as Equation (2) below.

$$ax_1^2 + bx_1 + c = 1/y_1 \quad (2)$$
$$ax_2^2 + bx_2 + c = 1/y_2$$
$$\vdots$$
$$ax_n^2 + bx_n + c = 1/y_n$$

Equation (2) represents equations for n pairs of edge values $(x_n, y_n)$ and positions of n edge value points. Equation (2) may be expressed in a matrix form, as shown in Equation (3) below.

$$\begin{bmatrix} x_1^2 & x_1 & 1 \\ x_2^2 & x_2 & 1 \\ & \vdots & \\ x_n^2 & x_n & 1 \end{bmatrix} \begin{bmatrix} a \\ b \\ c \end{bmatrix} = \begin{bmatrix} 1/y_1 \\ 1/y_2 \\ \vdots \\ 1/y_n \end{bmatrix} \quad (3)$$

Next, Equation (3) may be simplified to Equation (4) below.

$$A \begin{bmatrix} a \\ b \\ c \end{bmatrix} = y' \quad (4)$$

$$\begin{bmatrix} a \\ b \\ c \end{bmatrix} = (A^T A)^{-1} A^T y' \quad (5)$$

When Equation (3) is expressed as Equation (4), a coefficient value for an estimation model is obtained from a pseudo-inverse matrix of A, as shown in Equation (5). In this case, a position having a peak value becomes "−b/2a," as shown in Equation (6) below.

$$x_{peak} = -\frac{b}{2a} \quad (6)$$

Figure 4:
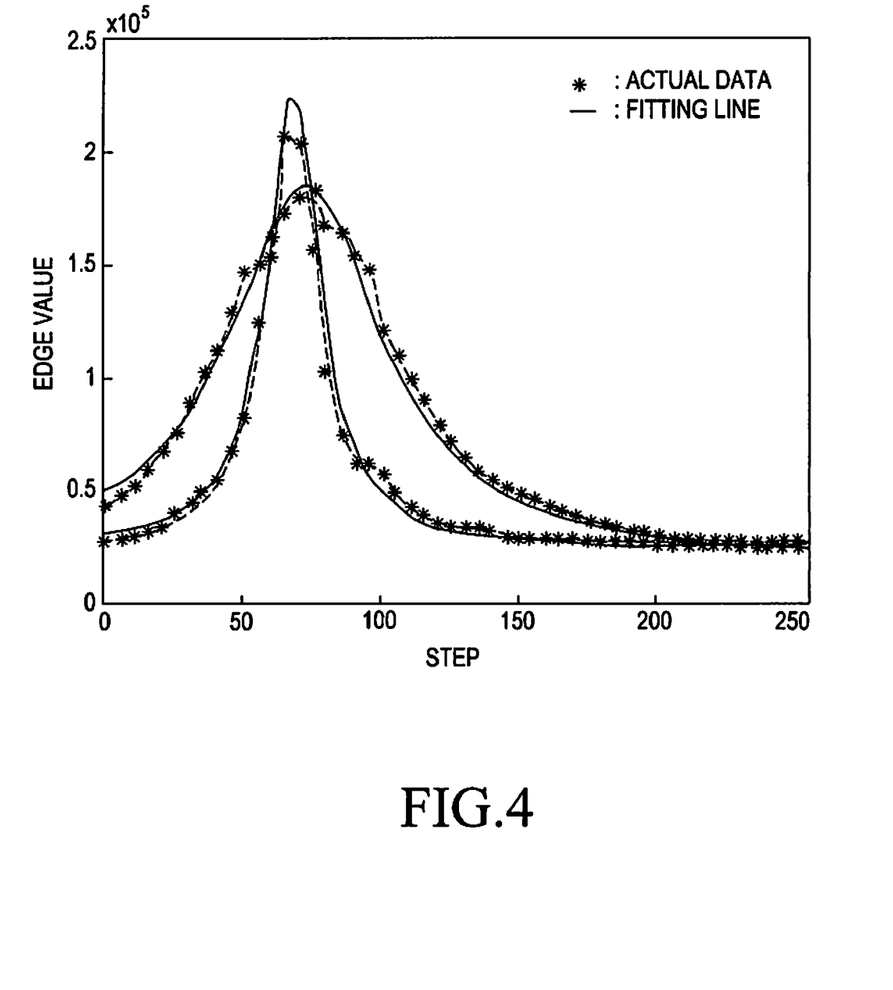
FIG. 4 is a graph illustrating an example of an estimation model of the quadratic polynomial function's inverse function obtained from sample data in the auto-focus control method according to an embodiment of the present invention.

FIG. 4 is a graph illustrating an example of an estimation model of the quadratic polynomial function's inverse function obtained from sample data in the auto-focus control method according to an embodiment of the present invention. The estimation model as shown in FIG. 4 may be calculated through the use of edge value data.

Figure 5A:
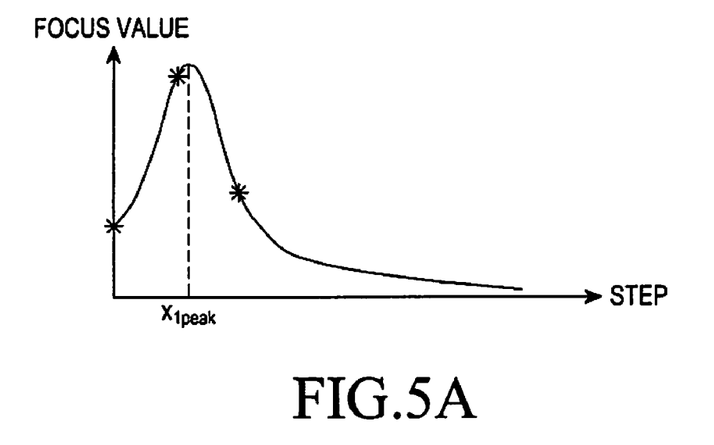
FIGS. 5A to 5C are graphs illustrating estimation models calculated whenever the number of pieces of sample data increases in the auto-focus control method according to an embodiment of the present invention.
Figure 5B:
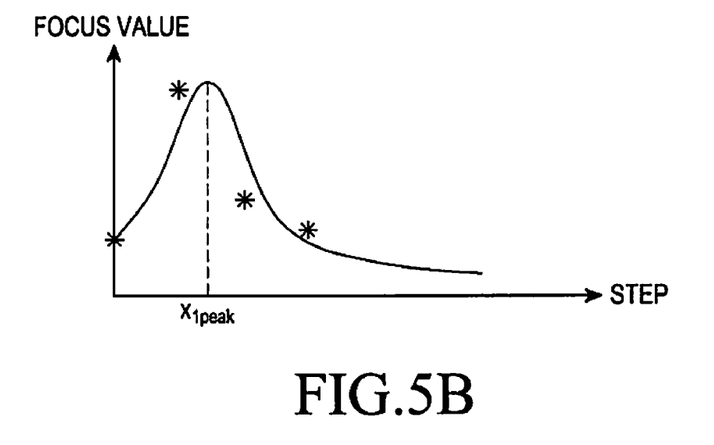
Figure 5C:
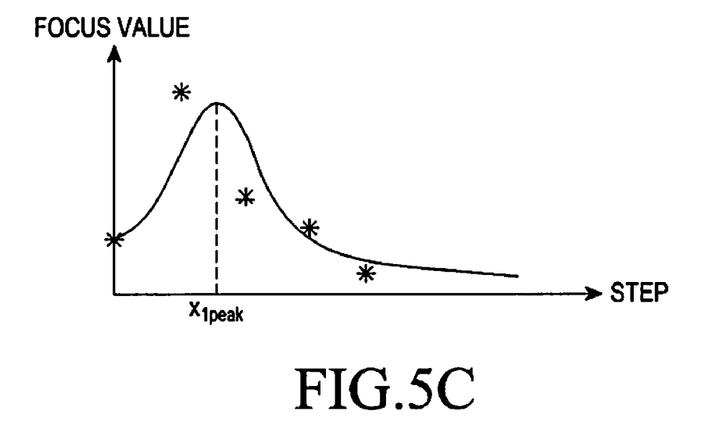

Referring back to FIG. 3, in step 630, an edge value is measured after the lens moves by a preset next interval, and a new fitted estimation model is calculated through the use of edge value data including the measured edge value. As the number of sampled edge values increases according to a new step interval, the shape of a fitted graph varies, and the position of a peak value varies, too. FIGS. 5A to 5C are graphs illustrating estimation models calculated whenever the number of pieces of sample data increases in the auto-focus control method according to an embodiment of the present invention. As shown in FIGS. 5A to 5C, as the focus lens moves by a preset interval, an estimation model having the form of the quadratic polynomial function's inverse function is newly calculated, and a corresponding peak value is obtained. FIG. 5A is a graph illustrating an estimation model which is estimated with three pieces of edge value data when the focus lens moves three times, FIG. 5B is a graph illustrating an estimation model which is estimated with four pieces of edge value data when the focus lens moves four times, and FIG. 5A is a graph illustrating an estimation model which is estimated with five pieces of edge value data when the focus lens moves five times. When a new estimation model is calculated, a difference between a peak value though an estimation model calculated at a previous position of the lens and a peak value though an estimation model calculated at the current position of the lens is calculated.

Figure 6:
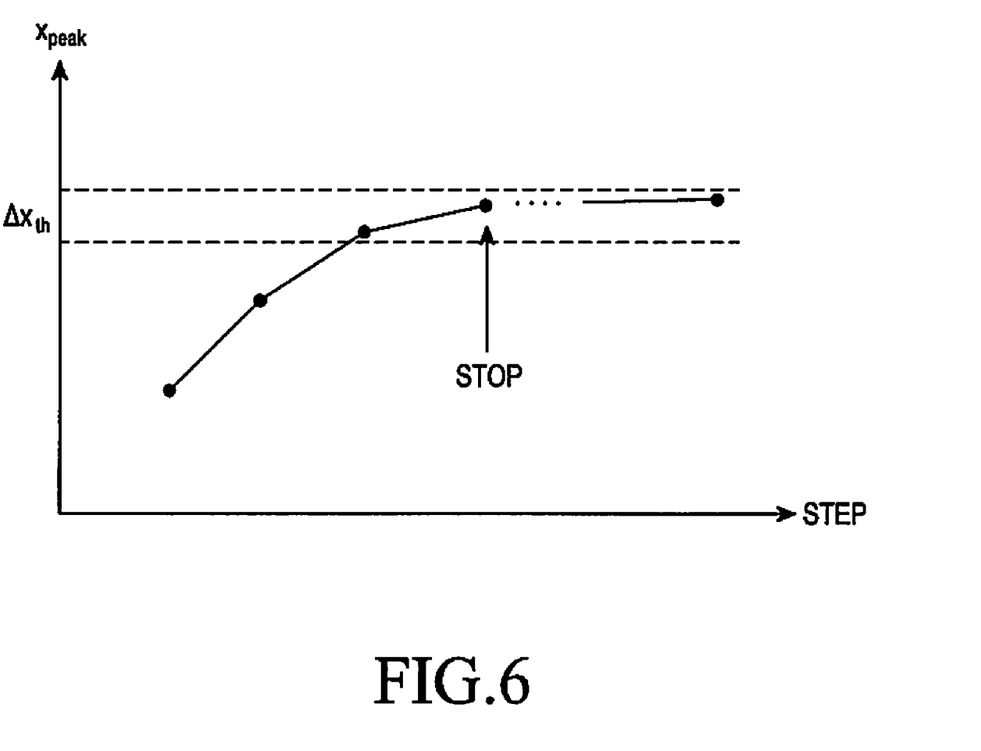
FIG. 6 is a graph illustrating peak values obtained through estimation models according to the positions (steps) of the focus lens.

Next, in step 640, it is determined if the difference between the peak value though the estimation model calculated at the previous position of the lens and the peak value though the estimation model calculated at the current position of the lens is less than or equal to a preset threshold value. As indicated above, FIGS. 5A to 5C illustrate estimation models calculated whenever the number of pieces of sample data increases in the auto-focus control method. FIG. 6 is a graph illustrating peak values obtained through estimation models according to the positions (steps) of the focus lens. According to an embodiment of the present invention, when a difference between a current peak value and a previous peak value is less than or equal to a preset threshold value $\Delta x_{th}$, the current position corresponding to the current peak value is determined to be a focused position. That is, referring to FIG. 6, a difference between the peak value of a fourth position and the peak value of a third position, which is a previous peak value, is less than the preset threshold value, so that the focus lens is moved and stopped at the position at which the fourth peak value has been detected.

In step 640, when the difference between the peak value though the estimation model calculated at the previous position of the lens and the peak value though the estimation model calculated at the current position of the lens is greater than the preset threshold value, the procedure proceeds to step 650. In step 650, the focus lens moves by a preset interval, and the process returns to steps 620 and 630 in which a new estimation model is calculated, a peak value is obtained, and then the procedure returns to step 640.

When the difference between the peak value through the estimation model calculated at the previous position of the lens and the peak value through the estimation model calculated at the current position of the lens is less than or equal to the preset threshold value as a result of step 640, the calculation for the estimation is terminated, the focus lens moves to an estimated position, photographing is performed, and then the procedure is terminated.

Meanwhile, when an estimation model is calculated using the least square method according to an embodiment of the present invention, there is a problem in that a small error is amplified. Such a problem can be solved by giving a higher weight to the periphery of a peak through the use of a weighted least square method. The weighted least square method is calculated by Equation (7) below.

$$\min \sum_i w_i(y_i - \hat{y}_i) \quad (7)$$

In Equation (7), "w" represents a weight, "y" represents an estimation model, and "i" represents a sampling order from one to n.

Equation (7) is expressed in a matrix form as shown in Equation (8) below, and a peak value can be calculated through the use of a pseudo-inverse matrix as shown in Equation (9) below.

$$\begin{bmatrix} x_1^2/w_1 & x_1/w_1 & 1/w_1 \\ x_2^2/w_2 & x_2/w_2 & 1/w_2 \\ \vdots \\ x_n^2/w_2 & x_n/w_2 & 1/w_2 \end{bmatrix} \begin{bmatrix} a \\ b \\ c \end{bmatrix} = \begin{bmatrix} 1/y_1/w_2 \\ 1/y_2/w_2 \\ \vdots \\ 1/y_n/w_2 \end{bmatrix} \quad (8)$$

$$\begin{bmatrix} a \\ b \\ c \end{bmatrix} = A_w^+ y' = (A_w^T A_w)^{-1} A_w^T y'_w \quad (9)$$

In Equations (8) and (9), "a," "b," and "c" represent coefficients of an estimation model of an inverse matrix of a quadratic polynomial function. In this case, a peak value can be calculated by Equation (6) as well.

According to an embodiment of the present invention, the movement of the lens for an auto-focus control is minimized in a digital camera, so that the user of the digital camera can rapidly take a desired photograph without missing a moment.

In addition, according to an embodiment of the present invention, it is possible to achieve a faster auto-focusing through improvement of an algorithm, even without a change in the characteristics or configuration of the basic components, including an electric actuator, an image signal processor (ISP), etc, which are used in the current camera module.

The operation and configuration of the auto-focus control method and apparatus of a digital camera according to an embodiment of the present invention can be implemented as described above. While the invention has been shown and described with reference to certain embodiments thereof, it will be understood by those skilled in the art that various changes in form and details may be made therein without departing from the spirit and scope of the invention as defined by the appended claims.

What is claimed is:

1. A method for auto-focus control of a digital camera, the method comprising the steps of
    moving a focus lens of the digital camera to a position for a longest-distance photographing, and then extracting an edge value according to a corresponding position while moving the focus lens by a preset interval in a direction toward an image sensor;
    estimating a form of a preset function based on the extracted edge values, and calculating a maximum value of the estimated function;
    calculating a difference between a maximum value of the preset function calculated at a first current position of the focus lens and a maximum value of the preset function calculated at a previous position of the focus lens; and
    moving the focus lens to a position corresponding to a currently-calculated maximum value of the preset function when the difference between the maximum value of the preset function calculated at the first current position of the focus lens and the maximum value of the preset function calculated at the previous position of the focus lens is less than or equal to a preset threshold value.

2. The method as claimed in claim 1, further comprising moving the focus lens by the preset interval when the difference between the maximum value of the preset function calculated at the first current position of the focus lens and the maximum value of the preset function calculated at the previous position of the focus lens is greater than the preset threshold value, extracting an edge value according to a corresponding position, and again estimating a form of the preset function through use of data of the edge value extracted according to a second current position of the focus lens and previously extracted edge values.

3. The method as claimed in claim 1, wherein moving a focus lens of the digital camera to a position for a longest-distance photographing, and then extracting an edge value according to a corresponding position while moving the focus lens by a preset interval includes moving the focus lens of the digital camera to the position for the longest-distance photographing, and then extracting an edge value at every position while successively moving the focus lens by the preset interval at least three times.

4. The method as claimed in claim 1, wherein the preset function corresponds to an inverse function of a quadratic polynomial function.

5. The method as claimed in claim 4, wherein estimating a form of a preset function based on the extracted edge values and calculating a maximum value of the estimated function includes setting a model function for a matrix operation to $ax^2+bx+c=1/y$ and calculating values of coefficients a, b, c of the inverse function of the quadratic polynomial function through use of a pseudo-inverse matrix in order to estimate a form of the inverse function of the quadratic polynomial function based on the extracted edge values, and obtaining a maximum value from the calculated coefficient values.

6. An apparatus for auto-focus control of a digital camera, the apparatus comprising:
    a lens unit configured with a focus lens which is movable along an optical axis in order to focus an optical image formed on an image sensor, the lens unit allowing the optical image of a subject to be formed on the image sensor;
    an image sensor unit for converting image information of the subject into an electrical signal;
    an image signal processor (ISP) for extracting an edge value from the electrical signal, into which the image information has been converted;
    a driving unit for physically moving the lens unit according to a control signal received from a controller; and
    the controller for controlling the driving unit to move the focus lens of the digital camera to a position for a longest-distance photographing, extracting an edge value according to a corresponding position while moving the focus lens by a preset interval in a direction toward the image sensor, estimating a form of a preset function based on the extracted edge values, calculating a maximum value of the estimated function, calculating a difference between a maximum value of the preset function calculated at a first current position of the focus lens and a maximum value of the preset function calculated at a previous position of the focus lens, and controlling the focus lens to move to a position corresponding to a currently-calculated maximum value of the preset function when the difference between the maximum value of the preset function calculated at the first current position of the focus lens and the maximum value of the preset function calculated at the previous position of the focus lens is less than or equal to a preset threshold value.

7. The apparatus as claimed in claim 6, wherein, when the difference between the maximum value of the preset function calculated at the first current position of the focus lens and the maximum value of the preset function calculated at the previous position of the focus lens is greater than the preset threshold value, the controller performs a control operation to move the focus lens by the preset interval, extract an edge value according to a corresponding position, and again estimate a form of the preset function through use of data of the edge value extracted according to a second current position of the focus lens and previously extracted edge values.

8. The apparatus as claimed in claim 6, wherein, when the controller moves the focus lens of the digital camera to the position for the longest-distance photographing, and extracts an edge value according to a corresponding position while moving the focus lens by the preset interval, the controller moves the focus lens of the digital camera to the position for the longest-distance photographing, and extracts an edge value at every position while successively moving the focus lens by the preset interval at least three times.

9. The apparatus as claimed in claim 6, wherein the preset function corresponds to an inverse function of a quadratic polynomial function.

10. The apparatus as claimed in claim 9, wherein, when the controller estimates a form of a preset function based on the extracted edge values and calculates a maximum value of the estimated function, the controller sets a model function for a matrix operation to $ax^2+bx+c=1/y$ and calculates values of coefficients a, b, c of the inverse function of the quadratic polynomial function through use of a pseudo-inverse matrix in order to estimate a form of the inverse function of the quadratic polynomial function based on the extracted edge values, and obtains a maximum value from the calculated coefficient values.

11. The apparatus as claimed in claim 6, wherein the lens unit is further configured with a zoom lens.

* * * * *